(12) United States Patent
Vannahme et al.

(10) Patent No.: US 7,163,637 B2
(45) Date of Patent: Jan. 16, 2007

(54) APPARATUS AND PROCESS FOR TAKING UP PARTICLES FROM A WATER SURFACE

(75) Inventors: Martin Vannahme, Ingolstadt (DE); Rolf Habel, Berlin (DE); Günther Clauss, Berlin (DE)

(73) Assignee: Technische Unversitat Berlin, Berlin (DE)

( * ) Notice: Subject to any disclaimer, the term of this patent is extended or adjusted under 35 U.S.C. 154(b) by 327 days.

(21) Appl. No.: 10/740,917

(22) Filed: Dec. 22, 2003

(65) Prior Publication Data

US 2005/0133464 A1    Jun. 23, 2005

(51) Int. Cl.
*E02B 15/04* (2006.01)

(52) U.S. Cl. .............. 210/776; 210/787; 210/242.1; 210/242.3; 210/923

(58) Field of Classification Search ............... 210/776
See application file for complete search history.

(56) References Cited

U.S. PATENT DOCUMENTS

| | | | | |
|---|---|---|---|---|
| 3,615,017 A | * | 10/1971 | Valdespino | 210/242.3 |
| 3,715,034 A | * | 2/1973 | Ivanoff | 210/242.3 |
| 3,789,988 A | * | 2/1974 | Valibouse et al. | 210/242.3 |
| 3,875,062 A | * | 4/1975 | Rafael | 210/242.3 |
| 3,966,615 A | * | 6/1976 | Petchul et al. | 210/242.1 |
| 4,370,229 A | * | 1/1983 | Grihangne | 210/242.3 |
| 4,372,854 A | * | 2/1983 | Szereday | 210/242.3 |
| 4,391,708 A | * | 7/1983 | Le Foll et al. | 210/242.3 |
| 4,491,518 A | * | 1/1985 | Benaroya et al. | 210/177 |
| 4,623,459 A | * | 11/1986 | Benaroya et al. | 210/242.3 |
| 5,194,164 A | * | 3/1993 | Adams | 210/776 |
| 2005/0133464 A1 | * | 6/2005 | Vannahme et al. | 210/766 |

FOREIGN PATENT DOCUMENTS

DE    102 21 069 A1    8/2004

OTHER PUBLICATIONS

Meerestechink-Meeer Als Eine Alternative, pp. 1-20.
Clauss et al., Technische Universität Berlin, "Entwicklung eines Ölskimmingverfahrens zur seegangsunabhängigen Ölbekämpfung", Jun. 3, 2004, pp. 1-79.

* cited by examiner

*Primary Examiner*—Robert James Popovics
*Assistant Examiner*—T. Woodruf
(74) *Attorney, Agent, or Firm*—Rothwell, Figg, Ernst & Manbeck, P.C.

(57) ABSTRACT

The invention relates to an apparatus and a process for taking up particles, in particular particles of oil, algae or dirt, from a water surface (2). A hull structure (1) is moved over the water surface (2). In this case, a flow (6) of water laden with particles is produced in the region of a bottom surface (7) of the hull structure (1). The flow (6) is broken away or interrupted along a vortexing edge (13) in the region of the bottom hull-structure surface (7), with the result that a vortex flow (14) is produced for at least some of the particle-laden water. The vortex flow (14) passes into a vortex flow space (15). With the aid of localizing means, the vortex flow (14) is localized in a separation section (23) of the vortex flow space (15), with the result that particles of the particle-laden water which are picked up by the vortex flow (14) can be separated from the separation section (23).

19 Claims, 5 Drawing Sheets

APPARATUS AND PROCESS FOR TAKING UP PARTICLES FROM A WATER SURFACE

The invention relates to an apparatus and a process for taking up particles, in particular particles of oil, algae or dirt, from a water surface.

It is often required for contamination to be cleaned from surfaces of sea water. In the past, for example, countless maritime accidents ended with devastating effects on the maritime fauna and flora and, furthermore, caused economic disaster for the fisheries and tourism in the contaminated areas. A particular consequence of a maritime accident is the contamination with leaking oil. Even the advent of double-walled oil tankers cannot do anything to change the fundamental risk of disaster.

The causes of oil spills on water surfaces, however, are not restricted to maritime accidents. Oil spillage is also caused by industry in coastal areas, leaking pipelines at the oil-production site itself, natural oil spillage on the seabed and deliberate oil spillage by ships' crews. In order to remove the variously produced oil slicks in the region of the water surface, use is made of oil-spill clearance systems, in particular oil-spill clearance vessels. In conjunction with the process of skimming the leaked oil, there is often the problem of the oil-spill clearance measures having to be interrupted on account of the swell of the sea. Such interruptions have an adverse effect on the entire oil-spill clearance operation, in particular it is possible for the leaked oil to spread as a thin layer of oil over a relatively large region of the water surface. Furthermore, the sea swell causes the oil slick to be broken up into small areas of spillage which, as far as the oil-spill clearance operation is concerned, are difficult to locate. In addition, the oil emulsifies, i.e. it binds together with water and air and thus becomes increasingly viscous, which renders the separation of the oil from the water surface, and the subsequent separation on board the oil-spill clearance vessels, considerably more difficult.

In order to make it possible for the oil-spill clearance measures to be continued even in the case of relatively high seas, a skimming principle which is dependent on the sea swell has been proposed (see "Design Criteria for a New Generation of Oil Skimming Vessels", Proceedings of the 11$^{th}$ Offshore and Polar Engineering Conference (ISOPE 2001), Stavanger, Norway). In this case, a skimmer is moved over the contaminated water surface such that the layer of dirt, in particular a layer of oil, in the region of the water surface is forced beneath the skimmer with a low level of vortexing, with the result that particles of the layer of dirt flow along the bottom surface of the skimmer. A bow of the skimmer is configured, in terms of flow, so as to damp waves on the water surface when they pass beneath the skimmer. The layer of dirt here flows along the bottom surface of the skimmer, the wave movements of the water surface being essentially damped. An adjustable separation component is arranged on the underside of the skimmer, with the result that a flow-channel section is formed between a section of the bottom surface of the skimmer and the separation component. The flow with the layer of dirt is guided into the flow-channel section through an inlet region. In a region above the separation component, it is then possible for the layer of dirt to be extracted by suction using a suitable system.

In the inlet region of the flow-channel section, vortex flows are produced above the separation component. This vortex flow formation may be enhanced by a vortexing edge being arranged, in the inlet region, on the bottom surface of the skimmer. This causes the vortex formation to be influenced in a specific manner. It has been established that, when use is made of the skimmer, the vortex flow is accompanied by a wave formation, with the result that the vortex flow moves in an uncontrolled manner in a vortex flow space which is formed on the skimmer, above the separation component, and into which the vortex flow passes.

DE-A 2 121 646 discloses a vessel for clearing layers of oil. In the region of a bow section, the vessel contains an opening through which, as the vessel travels over a water surface, water contaminated with particles of dirt, in particular particles of oil, passes into a hold, from which the particles of dirt can be extracted by suction with the aid of a suction appliance. Following passage through the opening in the bow section, the water laden with particles of dirt flows past an edge into the hold.

The object of the invention is thus to specify an improved apparatus and an improved process of the type mentioned in the introduction with which, even in conjunction with a sea swell and the resulting wave formation on the water surface, it is possible to achieve sufficient efficiency for taking up the particles from the, or from an adjacent region beneath the, water surface.

The solution to this object can be gathered from the independent claims. Advantageous configurations of the invention form the subject matter of dependent subclaims.

Provision is made for a vortex flow to be produced in a specific manner. In the vortex flow, which is induced by means of the vortexing edge, in particular the lighter particles, for example particles of oil, are conveyed upward, with the result that these particles accumulate in the top region of the vortex flow. Localizing means are used to achieve the situation where the vortex flow and thus the upwardly conveyed particles, despite the accompanying wave formation, are concentrated in the separation section of the vortex flow space. This results in the particles in the separation section which are to be taken up from the water being accumulated above the vortex flow, and they can then be taken up from there. Consequently, even under conditions in which a swell which is conventional for seas or other bodies of water prevails, the particles which are to be separated from the water are concentrated in a three-dimensional section, with the result that they can be separated from the water. The problems which are customary for known oil-spill clearance vessels, to the effect that the sea swell makes it considerably more difficult to separate the particles of oil or the layer of oil, or even renders this task impossible, are avoided.

An expedient development of the invention provides a separation component which is arranged beneath the hull structure, with the result that a flow-channel section is formed between the separation component and the hull structure, the flow of the particle-laden water passing, at least in part, through said flow-channel section. It is thus specifically possible for part of the flow of the particle-laden water, beneath the hull structure, to be fed to the vortex formation along the vortexing edge.

A preferred configuration of the invention provides that the separation component is arranged beneath the vortex flow space and forms a bottom boundary of the vortex flow space. This achieves additional calming of the wave movements which occur in the vortex flow space.

In order to optimize flexible use for different layers of dirt or contamination on water surfaces, it may be provided, in the case of a preferred development of the invention, that the separation component is configured as an adjustable component, in order for it to be possible to set a cross section of the flow-channel section.

It may expediently be provided, in the case of one embodiment of the invention, that the localizing means comprise an outlet opening in the region of the separation section, the outlet opening being connected to a pressure line in which a negative pressure is formed relative to a pressure in the separation section. Subjecting the outlet opening to negative pressure results in the vortex flow being subjected to a suction action, with the result that the vortex flow is localized in the region of the separation section. The particles which are conveyed upward on account of the vortex flow can then be separated from the separation section.

A possibility of providing the negative pressure at the outlet openings by way of mechanically straightforward means is achieved, in the case of an expedient development of the invention, in that the pressure line is connected to an opening in the bottom hull-structure surface in order to generate the negative pressure in the pressure line with the aid of a negative pressure which is produced when the particle-laden water flows along the bottom hull-structure surface.

In order to avoid a disturbance of the vortex flow and of the associated collection of the particles of dirt in the separation section on account of the sea swell during use of the apparatus for cleaning the water surface, a preferred embodiment of the invention provides wave-calming means in order to calm wave formation in the vortex flow space.

A possible way of forming the wave-calming means using straightforward mechanical means is achieved, in the case of an advantageous configuration of the invention, in that the wave-calming means comprise a ramp which is arranged on a border of the vortex flow space and the top surface of which slopes down in the direction of the border of the vortex flow space. This constitutes a straightforward but effective way of damping the wave formation in the vortex flow space.

The outlet opening is expediently arranged in the region of the top surface of the ramp, with the result that the vortex flow is kept in the vicinity of the ramp, where it is possible to achieve effective wave calming.

The calmed wave formation in the vortex flow space can be utilized, in the case of an advantageous development of the invention, for separating the contaminated particles in that the ramp is arranged, at least in part, in the region of the separation section and, on a side which is directed away from the vortex flow space, is adjacent to a collecting tank, with the result that at least some of the particles picked up by the vortex flow can pass into the collecting tank, via the ramp, as a result of the wave formation in the vortex flow space. To optimize this, it may be provided that the ramp is adjustable, for example height-adjustable, in order to optimize separation of the particles in the case of different use conditions, in particular different sea swells.

An advantageous embodiment of the invention may provide suction-extraction means for extracting the particles from the separation section of the vortex flow space by suction, in order to achieve efficient separation of the particles from the water surface.

In order to form a flow with the highest possible level of wave calming beneath the hull structure, it may be provided, in the case of a preferred configuration of the invention, that the hull structure comprises a bow section for calming waves on the water surface. Moreover, further wave-calming means may be provided on the hull structure in order to damp residual wave movements beneath the hull structure. This ensures the suitability of the apparatus for cleaning the water surface for use even in the case of relatively high seas.

The advantages which have been mentioned in conjunction with the dependent apparatus claims apply correspondingly to the respectively associated dependent process claims.

The invention is explained in more detail hereinbelow by way of exemplary embodiments and with reference to a drawing, in which.

Figure 1:
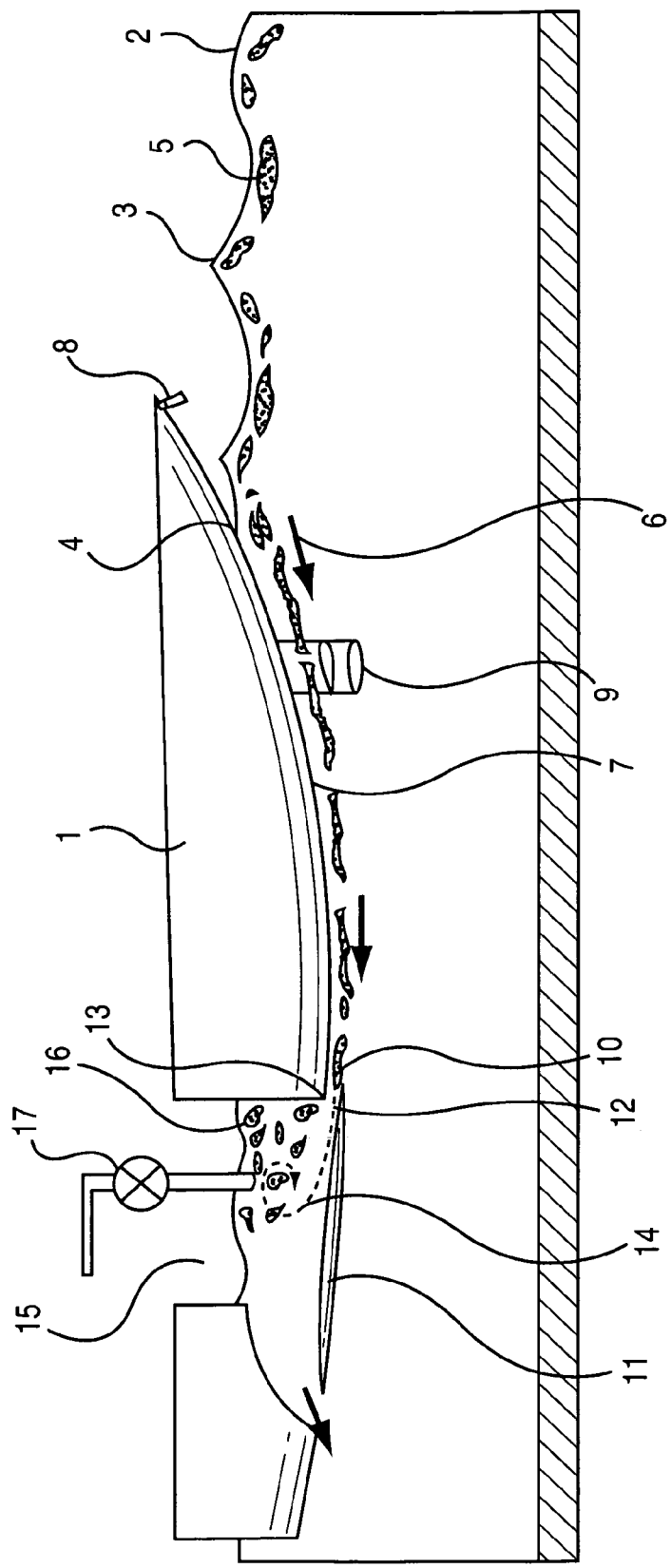
FIG. 1 shows, in cross section, a schematic illustration of an apparatus with a vortexing or break-away edge for cleaning a water surface.

According to FIG. 1, a hull structure 1 is moved over a water surface 2 in order to clean the water surface 2. Waves 3 are formed on the water surface 2 as a result of a sea swell. When the hull structure 1 is moved over the water surface 2, the waves 3 are calmed by means of a bow section 4 of the hull structure 1. A layer of particles of dirt formed on the water surface 2 is forced, by the movement of the hull structure 1 over the water surface 2, into a flow 6, which flows, beneath the hull structure 1, along a bottom surface 7 of the hull structure 1. The hull structure 1 is preferably moved at a speed of up to approximately 3 to 5 knots over the water surface 2, in order to form the desired flow 6 along the bottom surface 7. The water surface 2 can thus be cleaned more quickly than is the case with known oil-spill clearance vessels, since the known vessels can usually only be operated, for oil-clearance purposes, at speeds of, at most, approximately two knots.

In order to calm the waves 3, it is possible to provide further means on the hull structure 1, for example a flap 8 and/or a hydrodynamic flow-directing device (directing plates) 9, the flow 6 disturbed (vertically) by the waves 3 being oriented predominantly horizontally again, and calmed, thereby. The flap 8 is a movable flap which intercepts, and damps the movement of, the water with the particles which are to be separated, this water slamming as a result of the interaction between the bow section 4 and the waves 3. The oil or the particles which are to be separated then drips/drip down from the flap 8 and can pass beneath the bow section 4 again.

The flow 6 with particles from the layer 5 of particles of dirt flows beneath the hull structure 1 into an inlet region 10, which is formed between the bottom surface 7 of the hull structure 1 and a separation blade 11. In the inlet region 10, partial separation of the flow 6 takes place such that part of the flow 6 which essentially comprises the particles of the layer 5 of particles of dirt is guided into a flow-channel section 12, while the rest of the flow 6 is guided past beneath the separation blade 11. In order to optimize the flow separation, the separation blade 11 may be of adjustable configuration, with the result that it is possible to change a cross section of the inlet region 10. In order to adjust the separation blade 11, it may be provided that the latter can be pivoted about an axis perpendicular to the plane of the drawing in FIG. 1 and/or can be displaced in some other manner relative to the bottom surface 7 of the hull structure 1, for example, in order to change the spacing, the separation blade 11 can be moved nearer to the bottom surface 7 or further away therefrom.

A break-away or vortexing edge 13 is formed on the hull structure 1 in the inlet region 10 or downstream of the inlet region 10, as seen in the direction of the flow 6. Passing the vortexing edge 13 induces a vortex flow in the flow 6, this being illustrated schematically by means of arrows 14 in FIG. 1. The vortex flow 14 passes into a vortex flow space 15 and causes the particles of dirt contained in the flow 6 to move upward into a region 16, from where they can be extracted by suction with the aid of a suction appliance 17. The separation blade 11 and the vortexing edge 13 help to achieve specific flow guidance for the flow 6, this guidance already being initiated with the wave calming by way of the bow section 4.

The vortex flow 14 is accompanied by a wave movement in the vortex flow space 15, this being the result, on the one hand, of a movement of the hull structure 1 itself on account of the sea swell on the water surface 2 and, on the other hand, of residual wave movements, which are damped by means of the bow section 4, penetrating through the inlet region 10 into the flow-channel section 12. In this context, the separation blade 11 has a calming effect on the wave movement produced in the vortex flow space 15. This method of calming the wave movement, however, is not usually sufficient in order to limit disturbance to the induced vortex flow 14 to a sufficient extent such that the particles of dirt conveyed upward in the vortex flow 14 can be made available in a sufficiently calmed state for subsequent separation.

Figure 2:
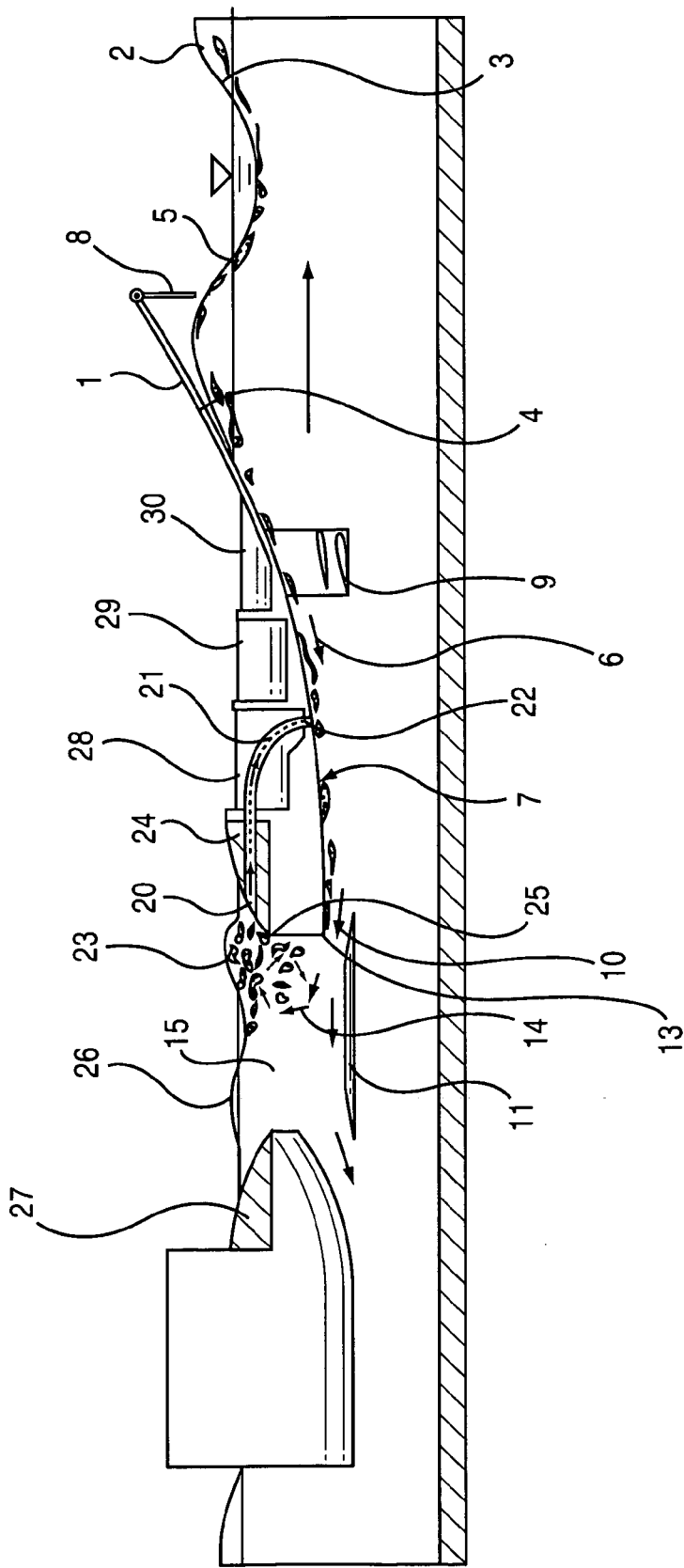
FIG. 2 shows, in cross section, a schematic illustration of a further apparatus with a vortexing or break-away edge for cleaning a water surface.

FIG. 2 shows a further embodiment of an apparatus for cleaning contaminated water surfaces. In comparison with the apparatus according to FIG. 1, the embodiment according to FIG. 2 contains, in particular, an outlet opening 20 in the region of the vortex flow space 15. The outlet opening 20 is connected, via a line 21, to an opening 22 in the region of the bottom surface 7 of the hull structure 1. A negative pressure is produced in the region of the opening 22 as a result of the flow 6 along the bottom surface 7, so that a negative pressure, in relation to the pressure in the vortex flow space 15, is formed in the line 21. This results in the vortex flow 14 being kept in a separation section 23 of the vortex flow space 15, which facilitates the separation of the particles of dirt. The number and size of the outlet openings 20 or further outlet openings (not illustrated), which are of similar design to the outlet opening 20, may be selected in dependence on the application. Provision may also be made here for the negative pressure in the line 21 to be generated with the aid of a suitable additional pressure device (not illustrated).

According to FIG. 2, a ramp or slope 24 is provided on a border 25 of the vortex flow space 15. The ramp 24 serves for calming waves 26 which are produced in the vortex flow space 15 as a result of the movement of the hull structure 1 itself on account of the sea swell on the water surface 2 and of residual wave movements, which are damped by means of the bow section 4, penetrating through the inlet region 10 into the flow-channel section 12. In the case of the embodiment according to FIG. 2, the outlet opening 20 is formed in the region of the ramp 24. If the ramp 24 is absent, in the case of a modified configuration, as is the case in FIG. 1 for example, the outlet opening 20 may be arranged in the region of walls of the vortex flow space 15, in order to bring about the abovedescribed localization of the vortex flow 14. In this case, it is also possible for the vortex flow 14 to be localized without any wave-calming elements, such as the ramp 24.

According to FIG. 2, a wave damper 27 is arranged opposite the ramp 24, in order to calm the waves 26 in the vortex flow space 15 further. The waves 26 in the vortex flow space 15 here are not damped to the full extent, which results in the particles of dirt which are accumulated in the separation section 23 passing into a collecting tank 28, via the ramp 24, as a result of the waves 26. The ramp 24 thus acts as a separation aid for the particles of dirt. It is essentially exclusively particles of dirt which collect in the collecting tank 28. According to FIG. 2, settling tanks 29, 30 are arranged in a cascade formation downstream of the collecting tank 28, in order to separate the particles of dirt further.

As an alternative, or in addition, to the ramp 24, it is possible to provide mechanical means for separating the particles of dirt from the separation section 23. These may be constituted, for example, by a roller (not illustrated) which is arranged in the region of the separation section 23. When the roller rotates, particles of dirt adhering to the surface of the roller are separated from the separation section 23 and are then separated, for example stripped off, from the roller. The rotation of the roller here may also give rise to the vortex flow 14 being subjected to a suction action, with the result that a localizing effect for the vortex flow 14 in the vortex flow space 15 is achieved by the roller. The roller may also be provided exclusively for bringing about the localizing effect.

The various measures for calming the waves 3 on the water surface 2 and the waves 26 in the vortex flow space 15 allow the water surface 2 to be cleaned even in the case of higher seas and wave heights which are double the height permitted in accordance with approved operating conditions for known oil-spill clearance vessels.

The abovedescribed apparatuses may be configured as floats with dedicated means of propulsion, for example as an independent ship or boat or as a supplementary component which, for movement over the water surface 2, is retained on a ship, a boat or some other type of float. Quick and efficient clearance of layers of oil on bodies of water in particular can be carried out with the aid of the apparatuses described, layers of oil being reliably removed in the case of normal and higher seas alike. It is basically possible, however, to separate any kind of particles which form contamination or an (undesirable) layer deposit, for example a layer of algae or a layer of chemicals, on the, or in the region beneath the, water surface 2. Provision may also be made here for the particles which are separated from the water surface 2 to be fed back to the water surface again following processing, for example cleaning. This may be the case, for example, in conjunction with algae cleaning. With the aid of the apparatuses described, it is possible for a wide variety of different particles of different sizes, the particles being present in the form of a layer on the water surface 2 or as particles on and/or in the region beneath the water surface, to be taken up and separated from the body of water. The process and the apparatus described are thus suitable, in principle, not just for cleaning water surfaces but also for taking up any desired particles in a body of water which rise up to the water surface 2 and collect there.

Figure 3:
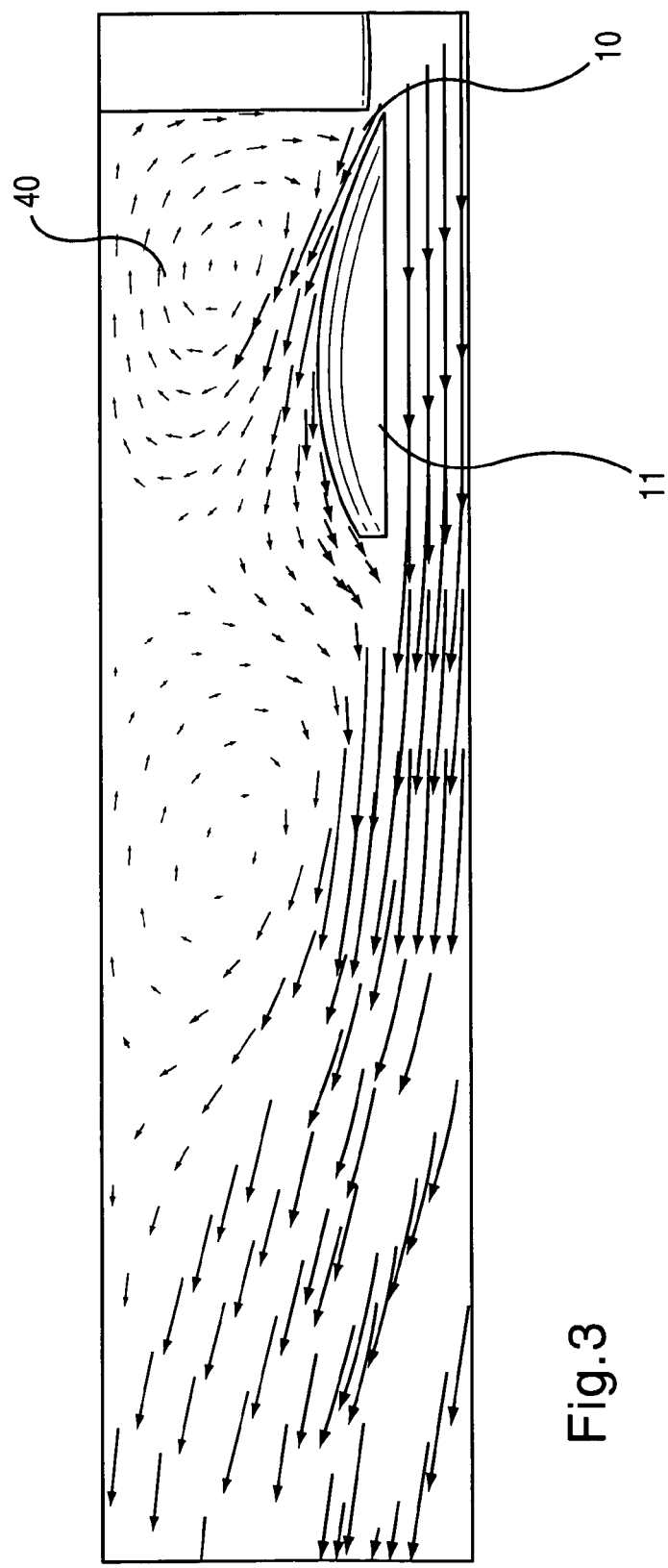
FIG. 3 shows an enlarged illustration of a vortex flow in the region of the vortexing or break-away edge.

FIG. 3 shows an enlarged illustration of the inlet region 10 and of part of the vortex flow space 15, including the vortexing edge 13 and the separation blade 11. A stationary vortex 40 forms directly downstream of the vortexing edge 13.

Figure 4:
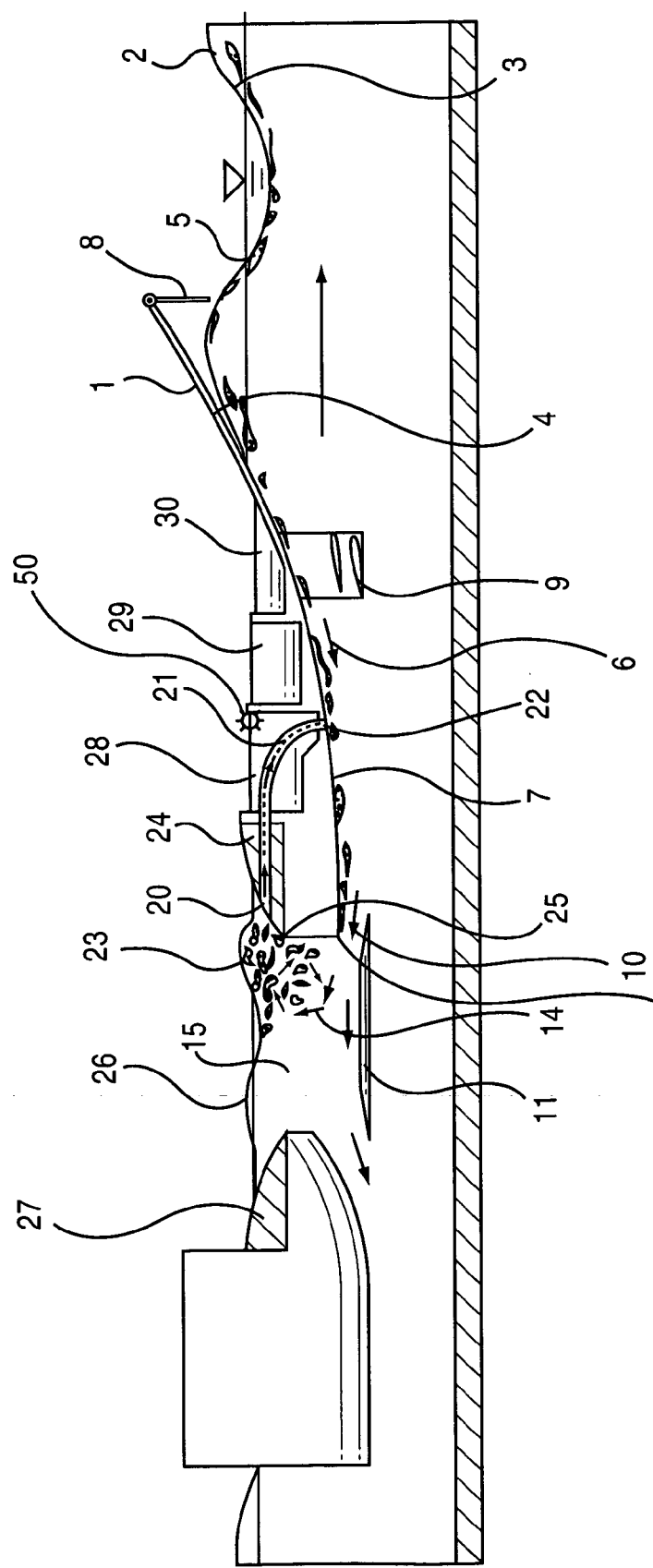
FIG. 4 shows, in cross section, a schematic illustration of the apparatus with a vortexing or break-away edge for cleaning a water surface according to FIG. 2, a separator being provided in addition.

FIG. 4 shows the apparatus for cleaning a water surface according to FIG. 2, there being provided, in the region of the collecting tank 28, a separator 50 by means of which the particles of dirt collected in the collecting tank 28 are separated with the smallest possible quantity of water and are conveyed into the settling tank 29. The separator 50 may be configured, for example, as a brush skimmer in which, with the aid of brushing means, the particles of dirt are taken up from the collecting tank 28 and stripped off with the aid of the brushing means and of a stripper (not illustrated), with the result that the particles of dirt pass into the settling tank 29 for further separation. The person skilled in the art is familiar with various embodiments of separators which can be utilized for this purpose. In addition, or as an alternative, it is also possible to provide separators in the region of the settling tank 29 (these separators not being illustrated), in order further to improve the separation of the particles of dirt from remaining quantities of water.

Figure 5:
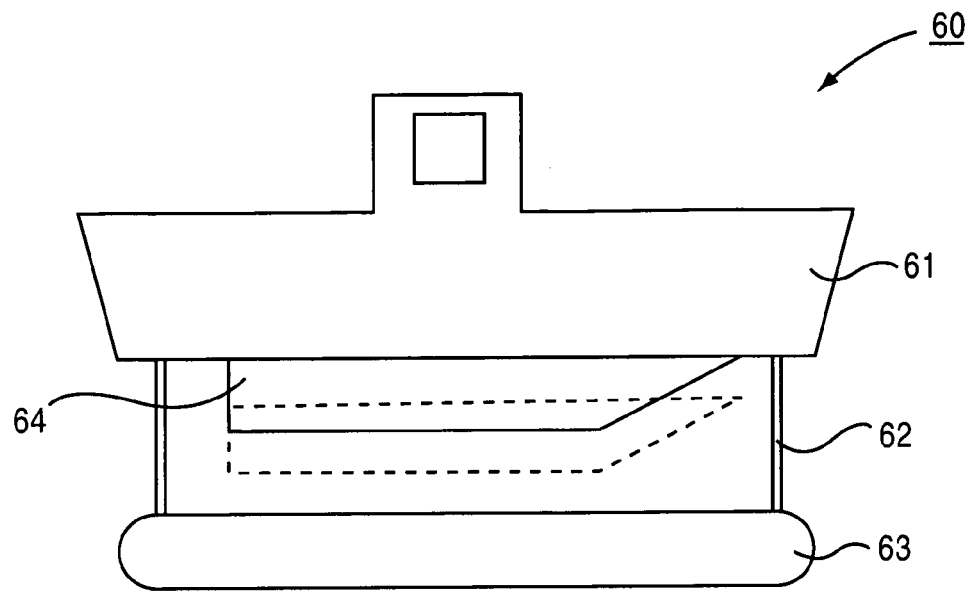
FIG. 5 shows a schematic illustration of a SWATH vessel.

The abovedescribed apparatuses for taking up particles of dirt from a water surface may be used in conjunction with different engine-driven vessels. FIG. 5 shows a SWATH vessel (SWATH-"Small-Waterplane-Area Twin-Hull") 60. This is a type of vessel in which use is made of a specific hull structure where the superstructures 61 with the deck are connected, via supports 62, to underwater floats/submersion aids 63. The floats 63 serve for providing the necessary buoyancy for the SWATH vessel 60 and are located beneath the water surface. The resistance of the SWATH vessel 60 is minimal in the region of the water surface since only the supports 62 are located there. The sea-swell action is reduced to a considerable extent with the aid of the SWATH structure since the waves, in practice, run through beneath the hull. The advantages of underwater displacement and of minimizing the water-line surface area are thus exploited in order, in particular in the case of relatively small vessels, to achieve considerably reduced vessel movements, as is otherwise only possible in the case of large vessels.

According to FIG. 5, an apparatus 64 for cleaning a water surface, as has been described with reference to FIGS. 1 to 4, is arranged on an underside of the vessel superstructures 61. For the purpose of taking up the particles of dirt, the apparatus 64 has to be brought into contact with the water surface. One possibility of achieving this is for the SWATH vessel 60 to be lowered as a whole with the aid of a change in the buoyancy of the floats 63, i.e. the vessel superstructures 61 move together with the apparatus 64 in the direction of the water surface. Furthermore, as an alternative, or in addition, a change in the distance between the water surface and the apparatus 64 for taking up the particles of dirt may be achieved by the apparatus 64 being lowered, as is illustrated with the aid of dashed lines in FIG. 5. In this case, the apparatus 64 is moved by a suitable raising/lowering means.

Figure 6:
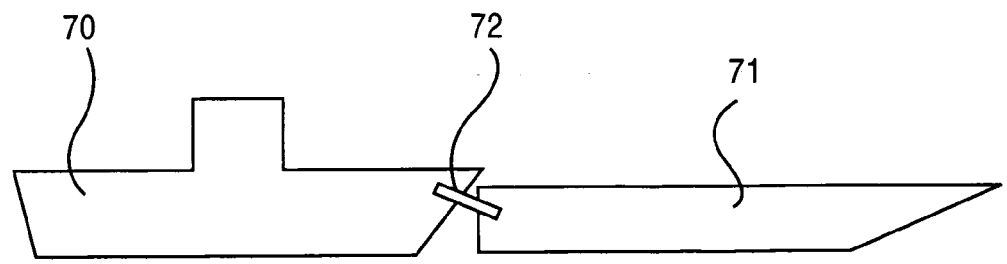
FIG. 6 shows a schematic illustration of a pushing unit with a vessel with a means of propulsion and a further vessel without a means of propulsion, this further vessel comprising an apparatus with a vortexing or break-away edge for cleaning a water surface according to FIG. 1 or 2.

FIG. 6 shows a pushing unit with a vessel 70, which is propelled via an engine, and an apparatus 71 for cleaning a water surface, as has been described in detail in conjunction with FIGS. 1 to 4. The vessel 70 and the apparatus 71 are coupled to one another via a coupling 72, for example with the aid of a cable or a mechanical coupling, to form a pushing unit which is conventional for vessels. The vessel 70 pushes the apparatus 71 in front of it, with the result that the particles of dirt can be taken up from the water surface as has been described above. In FIG. 6, the vessel 70 and the apparatus 71 are arranged one behind the other in the pushing unit. The term pushing unit in the sense used here, however, also covers embodiments in which the apparatus 71 is arranged to the side of the vessel 70, it being possible for the apparatus to be positioned directly adjacent to the hull of the vessel 70 or at a distance apart therefrom, and for the apparatus to be retained, for example, with the aid of a laterally projecting supporting arm.

Both in conjunction with the SWATH vessel 60 according to FIG. 5 and in the case of the pushing unit according to FIG. 6, it may be provided that the particles of dirt which are taken up are transferred into a collecting sack, for example an oil-collecting sack, arranged on the water surface outside the respective vessel, with the result that the respective vessel is not subjected to loading by the weight of the particles of dirt collected.

The features of the invention which are disclosed in the above description, the claims and the drawing may be of importance both individually and in any desired combination for the purpose of realizing the various embodiments of the invention.

The invention claimed is:

1. An apparatus for taking up particles, in particular particles of oil, algae or dirt, from a water surface (2), having:
   a hull structure (1) for moving over the water surface (2);
   a bottom surface (7) of the hull structure (1), along which a flow (6) of water laden with particles can be formed when the hull structure (1) is moved over the water surface (2);
   a vortexing edge (13) in the region of the bottom hull structure surface (7) for influencing the flow (6) of the particle-laden water, with the result that it is possible to produce a vortex flow (14) for at least some of the particle-laden water;
   a vortex flow space (15) for accommodating the vortex flow (14), the vortex flow space (15) being formed on the hull structure (1) downstream of the vortexing edge (13), as seen in a flow direction of the flow (6) of the particle-laden water; and
   localizing means for localizing the vortex flow (14) in a separation section (23) of the vortex flow space (15), with the result that particles of the particle-laden water which are picked up by the vortex flow (14) can be separated from the separation section (23);
      wherein wave-calming means (24; 27) are provided in order to calm wave formation in the vortex flow space (15), the wave-calming means comprise a ramp (24) which is arranged on a border (25) of the vortex flow space (15) and the top surface of which slopes down in the direction of the border (25) of the vortex flow space (15).

2. The apparatus as claimed in claim 1, which comprises a separation component (11) which is arranged beneath the hull structure (1), with the result that a flow-channel section (12) is formed between the separation component (11) and the hull structure (1), the flow (6) of the particle-laden water passing, at least in part, through said flow-channel section.

3. The apparatus as claimed in claim 2, wherein the separation component (11) is arranged beneath the vortex flow space (15) and forms a bottom boundary of the vortex flow space (15).

4. The apparatus as claimed in claim 2, wherein the separation component (11) is configured as an adjustable component, in order for it to be possible to set a cross section of the flow-channel section (12).

5. The apparatus as claimed in claim 1, wherein the localizing means comprise an outlet opening (20) in the region of the separation section (23), the outlet opening (20) being connected to a pressure line (21) in which a negative pressure is formed relative to a pressure in the separation section (23).

6. The apparatus as claimed in claim 5, wherein the pressure line (21), is connected to an opening (22) in the bottom hull-structure surface (7) in order to generate the negative pressure in the pressure line (21) with the aid of a negative pressure which is produced when the particle-laden water flows along the bottom hull-structure surface (7).

7. The apparatus as claimed in claim 5, wherein the outlet opening (20) is arranged in the region of the top surface of the ramp (24).

8. The apparatus as claimed in claim 1, wherein the ramp (24) is arranged, at least in part, in the region of the separation section (23) and, on a side which is directed away from the vortex flow space (15), is adjacent to a collecting tank (28), with the result that at least some of the particles picked up by the vortex flow (6) can pass into the collecting tank (28), via the ramp (24), as a result of the wave formation in the vortex flow space (15).

9. The apparatus as claimed in claim 1, which comprises suction-extraction means (17) for extracting the particles from the separation section (23) of the vortex flow space (15) by suction.

10. The apparatus as claimed in claim 1, wherein the hull structure (1) has a bow section (4) for calming waves on the water surface (2).

11. The apparatus as claimed in claim 1, wherein further wave-calming means (8, 9) are provided on the hull structure (1) in order to damp residual wave movement beneath the hull structure (1).

12. A vessel with a SWATH-like hull structure, in which a superstructure and a plurality of floats connected to the superstructure are provided, an apparatus for taking up particles from a water surface as claimed in claim 1 being arranged beneath the superstructure.

13. An arrangement with an engine-driven vessel, to which is coupled a further vessel with an apparatus for taking up particles from a water surface as claimed in claim 1, with the result that a pushing unit is formed.

14. The arrangement as claimed in claim 13, the further vessel not having its own means of propulsion.

15. A process for taking up particles, in particular particles of oil, algae or dirt, from a water surface (2), the process comprising the following steps:

moving a hull structure (1) over the water surface (2), with the result that a flow (6) of water laden with particles is formed along a bottom surface (7) of the hull structure (1);

forming a vortex flow (14) for at least some of the particle-laden water on a vortexing edge (13) in the region of the bottom hull-structure surface (7);

accommodating the vortex flow (14) in a vortex flow space (15), which is formed on the hull structure (1) downstream of the vortexing edge (13), as seen in a flow direction of the flow (6) of the particle-laden water; localizing the vortex flow (14) in a separation section (23) of the vortex flow space (15) with the aid of localizing means;

providing wave-calming means (24; 27) in order to calm wave formation in the vortex flow space (15), the wave-calming means comprise a ramp (24) which is arranged on a border (25) of the vortex flow space (15) and the top surface of which slopes down in the direction of the border (25) of the vortex flow space (15); and separating from the separation section (23) particles of the particle-laden water which are picked up by the vortex flow (14).

16. The process as claimed in claim 15, wherein the flow (6) of the particle-laden water is guided, at least in part, by a flow-channel section (12) which is formed beneath the hull structure (1), between a separation component (11) and the hull structure (1).

17. The process as claimed in claim 15, wherein, in order to localize the vortex flow (14) in the separation section (23) of the vortex flow space (15), an outlet opening (20) in the region of the separation section (23) is subjected to a negative pressure via a pressure line (21).

18. The process as claimed in claim 17, wherein, in order to generate the negative pressure, use is made of a negative pressure which is generated when the particle-laden water flows along the bottom hull-structure surface (7).

19. The process as claimed in claim 15, wherein, in order for the particles picked up by the vortex flow (14) to be separated from the separation section (23), use is made of a wave formation in the vortex flow space (15), with the result that the particles are guided into a collecting tank (28) via said ramp (24) arranged in the region of the separation section (23).

* * * * *